United States Patent [19]

Rice

[11] Patent Number: 5,080,198
[45] Date of Patent: Jan. 14, 1992

[54] APPARATUS FOR GREASING WHEEL BEARINGS

[76] Inventor: Gene A. Rice, 2817 Meandering Way, Bedford, Tex. 76021

[21] Appl. No.: 475,674
[22] Filed: Feb. 6, 1990
[51] Int. Cl.[5] .............................................. F16N 21/00
[52] U.S. Cl. ................................... 184/105.3; 184/5.1
[58] Field of Search ................... 184/5, 5.1, 105.3, 39, 184/45.1, 45.2

[56] References Cited

U.S. PATENT DOCUMENTS

| | | | |
|---|---|---|---|
| 2,369,178 | 2/1945 | Richmond et al. | 184/5.1 |
| 2,438,128 | 3/1948 | Poyner | 184/5.1 |
| 2,886,132 | 5/1959 | Gittinger et al. | 184/5.1 |
| 2,911,068 | 11/1959 | Wright | 184/5.1 |
| 3,724,596 | 4/1973 | Freda | 184/5.1 |
| 3,903,992 | 9/1975 | Chivukula et al. | 184/5.1 |
| 3,955,852 | 5/1976 | De Puydt et al. | 301/108 R |
| 4,058,185 | 11/1977 | Ploeger | 184/41 |
| 4,106,816 | 8/1978 | August | 301/108 R |
| 4,113,061 | 9/1978 | Peaster | 184/41 |
| 4,190,133 | 2/1980 | Ploeger | 184/5.1 |
| 4,293,056 | 10/1981 | Setree | 184/5.1 |

Primary Examiner—Ira S. Lazarus
Assistant Examiner—Alan B. Cariaso
Attorney, Agent, or Firm—James E. Bradley

[57] ABSTRACT

A device for injecting grease into a wheel bearing avoids the need for removing the seal ring of the wheel bearing. The device has a hollow mandrel with a closed bottom. A flange extends outward from the mandrel for contact with an inner cage ring of the hearing. A collar extends radially outward from the mandrel above the flange. The collar has an outer edge for contacting the seal ring. The collar is axially movable relative to the flange. A spring urges the collar and flange apart from each other. A port is located in the mandrel between the collar and the flange. A grease fitting allows grease to be introduced into the mandrel to flow out the port, into the space between the collar and the flange, and into the wheel bearing.

5 Claims, 1 Drawing Sheet

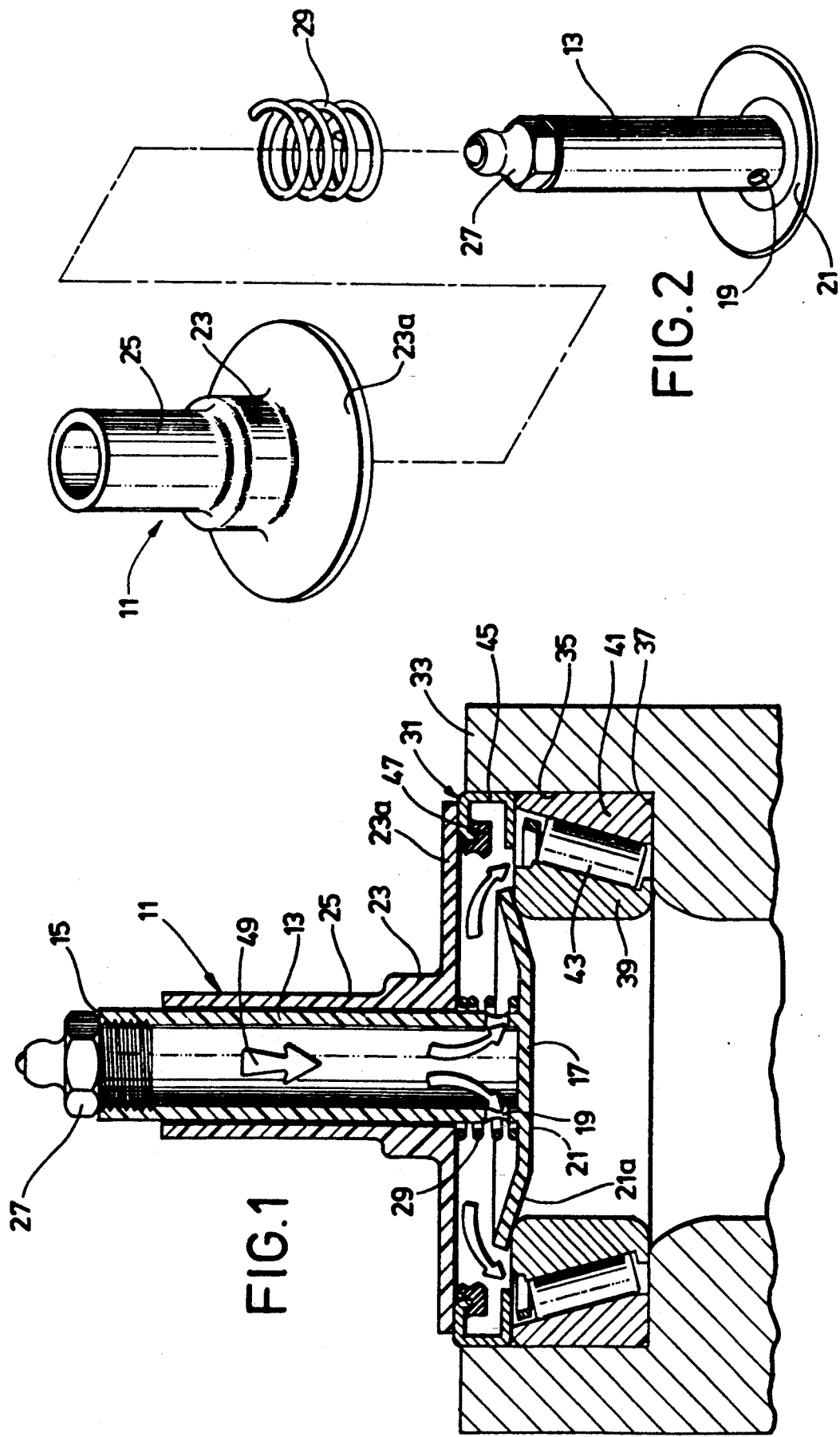

APPARATUS FOR GREASING WHEEL BEARINGS

BACKGROUND OF THE INVENTION

1. Field of the Invention

This invention relates in general to devices for injecting grease into a bearing, and particularly to a device for greasing a wheel bearing in place.

2. Description of the Prior Art

Most automobile and truck wheels are mounted on a bearing located inside the wheel hub. The bearing is located on the inside of the wheel within a counterbore in the hub. The bearing is a roller bearing that receives an axle of the vehicle when the wheel is placed on the axle. A seal fits over the bearing to seal the bearing from foreign matter.

To grease a wheel bearing of this type, normally the mechanic will take off the wheel, pry out the seal, then pull the bearing out. He will then press grease into the bearing. He then inserts the bearing and seal back into the counterbore.

A disadvantage to this technique is that when the seal is removed, it is frequently damaged. Consequently, lubricating the bearings results in the need to purchase a new seal. If a damaged seal is not replaced, often it will leak foreign matter into the bearings, shortening the life of the bearings.

SUMMARY OF THE INVENTION

A grease injector is provided with this invention which enables the bearing to be lubricated in place. The bearing and seal need not be removed. The grease injector has a hollow mandrel with a closed bottom. A flange extends outward from the mandrel for contact with the bearing inner cage ring. A collar extends outward from the mandrel above the flange for contacting the seal ring. The collar is axially movable relative to the flange. Preferably, a spring urges the collar and flange apart from each other.

The mandrel has a port located between the collar and flange. A grease fitting allows grease to be introduced which will flow through the mandrel and out the port. The grease flows into the space between the collar and flange and into the bearing.

BRIEF DESCRIPTION OF THE DRAWINGS

FIG. 1 is a vertical sectional view illustrating a grease injector constructed in accordance with this invention and shown in place on a wheel bearing.

FIG. 2 is a perspective exploded view of the injector of FIG. 1.

DETAILED DESCRIPTION OF THE INVENTION

Referring to FIG. 1, grease injector 11 has a mandrel 13. Mandrel 13 is a cylindrical tube having an open top 15 and a closed bottom 17. A plurality of ports 19 extend through the sidewall of the mandrel 13. The ports 19 are located near the bottom 17. The words "upward", "downward", "top" and "bottom" are used for convenience herein. The grease injector 11 need not be oriented vertically as shown in FIG. 1 in order to operate.

A flange 21 integrally joins the bottom 17 and extends outward from the mandrel 13. Flange 21 is generally convex. The outer edge 21a of the flange turns upward. A collar 23 slidably mounts to the exterior of the mandrel 13 above the flange 21. Collar 23 has an outer portion 23a that extends radially outward a distance greater than the radial extent of flange 21. The outer portion 23a is flat. Collar 23 also has a tubular neck 25 that extends upward. The space between the collar 23, neck 25 and the exterior of the mandrel 13 is sufficiently small so as to provide a seal.

A conventional grease fitting 27 secures to threads in the top 15 of the mandrel 13. Grease fitting 27 is a check valve that will allow the introduction of grease from a conventional grease gun, and prevent grease from flowing back.

The collar 23 will be axially movable relative to the flange 21 along the axis of the mandrel 13. A coil spring 29 encircles the mandrel 13 to urge the collar 23 and flange 21 apart from each other.

The injector 11 is for use with a wheel bearing assembly 31. The wheel bearing assembly 31 mounts in a wheel hub 33, which will be located on the interior of a vehicle wheel. Counterbore 35 extends into the wheel hub 33. A shoulder 37 defines the lower end of the counterbore 35.

Wheel bearing assembly 31 includes an inner cage ring 39 and an outer cage ring 41. The inner cage ring 39 has an inner diameter that is selected to receive an axle (not shown) of a vehicle. The outer surface of the outer cage ring 41 fits snugly in the counterbore 35. The upper edge of the inner cage ring 39 is rounded.

A plurality of cylindrical rollers 43 locate between the inner and outer cage rings 39, 41. A seal ring 45, which includes an elastomeric lip 47, locates above the cage rings 39, 41. Seal ring 45 extends radially inward about half the radial width of the assembled wheel bearing 31. When the hub 33 is removed from the vehicle, the seal ring 45 will not block access to the rollers 43 between the cage rings 39, 41. The upper surface of the inner cage ring 39 will be exposed. In use, a portion of the axle (not shown) will contact the elastomer 47, which seals against foreign matter.

The outer diameter of the flange 21 is only slightly greater than the inner diameter of the inner cage ring 39 and is smaller than the inner diameter of elastomer 47. The outer diameter of collar outer portion 23a is greater than the inner diameter of seal ring 45 and slightly less than the outer diameter of seal ring 45. The flange upturned edge 21a is formed at an angle selected so that the lower side of flange 21 will contact with the curved upper edge of the inner cage 39.

In operation, the mechanic will remove the wheel to expose the wheel bearing 31. He places the injector 11 on the wheel bearing 31. He presses the upturned edge 21a of flange 21 tightly against the upper edge of the inner cage ring 39. He presses the collar 23 against the wheel bearing 31. The outer portion 23a of collar 23 will bear against the upper side of seal ring 45. The coil spring 29 will assist in maintaining a tight contact of the flange edge 21a with the inner cage ring 39.

He presses a grease gun (not shown) to the fitting 27 and begins introducing grease. The grease will flow down the mandrel 13, out the port 19 and into the space between the flange 21 and the collar 23, as indicated by arrows 49. The grease flows downward between the inner and outer cage rings 39, 41 in contact with the rollers 43. The close fit between the collar 23, neck 25 and the exterior of the mandrel 13 prevents grease from flowing upward between the collar 23, neck 25 and mandrel 13. Once grease begins to extrude out the opposite side of the wheel bearing 31, the mechanic stops pumping grease. He removes the grease gun then places the wheel back on the vehicle axle.

The invention has significant advantages. The grease injector allows a wheel bearing to be greased without removing the seal ring. The grease injector is small, inexpensive, and simple in construction. The grease injector is easy to operate.

While the invention has been shown in only one of its forms, it should be apparent to those skilled in the art that it is not so limited, but is susceptible to various changes without departing from the scope of the invention.

I claim:

1. An apparatus for greasing a wheel bearing mounted in a counterbore of a wheel hub, the wheel bearing being of a type having a plurality of rollers mounted between inner and outer cage rings and having a seal ring, the apparatus comprising in combination:

a hollow mandrel having a closed bottom;
a flange extending outward from the mandrel for contact with the inner cage ring;
a collar extending radially outward from the mandrel above the flange and having an outer edge adapted to contact the seal ring;
the collar and flange being carried by the mandrel for axial movement relative to each other, to assure tight contact between the collar and the seal ring and between the flange and the inner cage ring;
check valve means for introducing grease into the mandrel;
at least one port in the mandrel between the flange and the collar for allowing grease to flow from the mandrel into the space between the flange and collar and into contact with the rollers; and
spring means for urging the collar and flange apart from each other.

2. An apparatus for greasing the wheel bearing of a type mounted in a counterbore of a wheel hub, the wheel bearing having a plurality of rollers mounted between inner and outer cage rings and having a seal ring, the apparatus comprising in combination:

a hollow mandrel having a closed bottom;
check valve means mounted to the mandrel for introducing grease into the mandrel;
a flange extending outward from the mandrel at the bottom of the mandrel for contact with the inner cage ring;
a collar slidingly and sealingly mounted to the exterior of the mandrel above the flange, the collar extending radially outward a greater distance than the flange and having an outer edge for contact with the seal ring;
at least one port in the mandrel adjacent the bottom of the flange between the flange and the collar for allowing grease to flow from the mandrel into the space between the flange and collar and into contact with the rollers; and
spring means for urging the collar and flange apart from each other.

3. The apparatus according to claim 2 wherein the spring means comprises a coil spring located between the collar and the flange.

4. The apparatus according to claim 2 wherein the flange has a lower side which has an upward turned outer edge.

5. The apparatus according to claim 2 wherein the check valve means mounts to an upper end of the mandrel.

* * * * *